US012589891B2

(12) United States Patent

Stockfleth

(10) Patent No.: US 12,589,891 B2

(45) Date of Patent: Mar. 31, 2026

(54) CARRIER ROCKET SYSTEM WITH CARRIER ROCKET AND LAUNCH ASSISTANCE UNIT

(71) Applicant: ArianeGroup GmbH, Taufkirchen (DE)

(72) Inventor: Holger Stockfleth, Taufkirchen (DE)

(73) Assignee: ArianeGroup GmbH, Taufkirchen (DE)

( * ) Notice: Subject to any disclaimer, the term of this patent is extended or adjusted under 35 U.S.C. 154(b) by 0 days.

(21) Appl. No.: 17/495,888

(22) Filed: Oct. 7, 2021

(65) Prior Publication Data

US 2022/0111978 A1     Apr. 14, 2022

(30) Foreign Application Priority Data

Oct. 9, 2020     (DE) .......................... 102020126575.1

(51) Int. Cl.
| | |
|---|---|
| *B64G 1/00* | (2006.01) |
| *B64G 1/62* | (2006.01) |
| *B64G 1/64* | (2006.01) |

(52) U.S. Cl.
CPC ............. *B64G 1/005* (2013.01); *B64G 1/002* (2013.01); *B64G 1/623* (2023.08); *B64G 1/641* (2013.01)

(58) Field of Classification Search
CPC ........... B64G 1/005; B64G 1/002; B64D 5/00
See application file for complete search history.

(56) References Cited

U.S. PATENT DOCUMENTS

| | | | | | |
|---|---|---|---|---|---|
| 3,702,688 | A | * | 11/1972 | Faget | B64G 1/14 |
| | | | | | 244/172.3 |
| 4,884,770 | A | * | 12/1989 | Martin | B64G 1/14 |
| | | | | | 244/159.3 |

(Continued)

FOREIGN PATENT DOCUMENTS

| | | | |
|---|---|---|---|
| DE | 0778200 | A2 * | 6/1997 |
| DE | 19545711 | C1 | 6/1997 |

(Continued)

OTHER PUBLICATIONS

Supplemental German Search Report; priority document.

(Continued)

*Primary Examiner* — Richard Green
*Assistant Examiner* — Nevena Aleksic
(74) *Attorney, Agent, or Firm* — Greer Burns & Crain Ltd.

(57) ABSTRACT

A carrier rocket system, with a carrier rocket, together with a launch assistance unit, which is detachably connected, or connectable, to the carrier rocket. The carrier rocket system is set up to take off in a horizontal launch via the launch assistance unit when thrust is generated by at least one propulsion unit of the carrier rocket. The launch assistance unit can be detached from the onward-flying carrier rocket after supersonic velocity has been reached, and is set up to fly back to the earth's surface after its detachment from the carrier rocket. The launch assistance unit preferably provides all the necessary structural supports to enable a carrier rocket that has been designed for a vertical launch to use one or more of its essential components without structural modifications. Also disclosed are a take-off method for a carrier rocket system, and a manufacturing method for a carrier rocket system.

9 Claims, 2 Drawing Sheets

(56)                    References Cited

U.S. PATENT DOCUMENTS

| 5,255,873 | A | | 10/1993 | Nelson | |
|---|---|---|---|---|---|
| 5,402,965 | A | * | 4/1995 | Cervisi | B64G 1/005 |
| | | | | | 244/159.3 |
| 5,456,424 | A | * | 10/1995 | Palmer | B64G 1/402 |
| | | | | | 244/171.4 |
| 6,193,187 | B1 | * | 2/2001 | Scott | F02K 7/10 |
| | | | | | 244/171.1 |
| 8,403,254 | B2 | * | 3/2013 | Ustinov | B64G 1/006 |
| | | | | | 244/158.9 |
| 10,384,797 | B2 | * | 8/2019 | Burgener | B64D 39/00 |
| 2005/0082424 | A1 | * | 4/2005 | Yamamoto | B64F 1/04 |
| | | | | | 244/63 |
| 2005/0204910 | A1 | | 9/2005 | Padan | |
| 2013/0299626 | A1 | | 11/2013 | Smith et al. | |
| 2018/0339793 | A1 | | 11/2018 | Chaudhary et al. | |
| 2019/0359330 | A1 | | 11/2019 | Zhao | |

FOREIGN PATENT DOCUMENTS

| DE | 102018132141 | A1 | * | 6/2020 | | B64U 50/12 |
|---|---|---|---|---|---|---|
| EP | 0778200 | A2 | * | 6/1997 | | |
| RU | 2482030 | C2 | | 2/2013 | | |

OTHER PUBLICATIONS

European Search Report for corresponding European Patent Application No. 21200510 dated Feb. 10, 2022.
German Search Report; priority document.

* cited by examiner

CARRIER ROCKET SYSTEM WITH CARRIER ROCKET AND LAUNCH ASSISTANCE UNIT

CROSS-REFERENCES TO RELATED APPLICATIONS

This application claims the benefit of the German patent application No. 102020126575.1 filed on Oct. 9, 2020, the entire disclosures of which are incorporated herein by way of reference.

FIELD OF THE INVENTION

The present invention relates to a carrier rocket system, which comprises a carrier rocket for the transport of at least one load, together with a launch assistance unit. The invention further relates to a carrier rocket for such a carrier rocket system, a take-off method, together with a manufacturing method, in each case for such a carrier rocket system.

BACKGROUND OF THE INVENTION

Carrier rockets are used in space travel to transport loads, such as, in particular, components or supply material for a space station, or also satellites, from the earth's surface into a designated orbit.

Various techniques are of known art for the enabling of the ascent of such carrier rockets. Thus, for example, the concept of the Pegasus carrier rocket provides for a coupling to a conventional transport aircraft (e.g., B-52 and Lockheed Tristar, Pegasus/Boeing 747-400, Carrier Rocket One), such that the carrier rocket is transported to a designated altitude and is then released (disengaged) for the rocket-powered onward flight.

From the document U.S. Pat. No. 5,255,873 a wing-glide system is of known art, which is connected to a spacecraft. This is intended to enable a launch from an airport runway. After reaching a designated angle of ascent, but in order to avoid increased aerodynamic braking resistance before reaching the speed of sound (in particular, at a Mach number of 0.9), the wing system is released from the spacecraft.

The document DE 195 45 711 C1 discloses a reusable support body with aerodynamic means of lift for the launch assistance of an aircraft such as, in particular, a rocket. In particular, the support body has propellant tanks for connection to the aircraft, whose propulsion unit is fed from the propellant tanks in the support body during the transport phase, and generates the thrust for the entire arrangement. Isolation valves allow a separation of the propellant tanks in the support body when the latter is detached.

In accordance with alternative conventional concepts, a vertical launch is intended for the carrier rocket. The vertical launch of such rockets can take place with or without auxiliary rockets to be separated (so-called "boosters"), which comprise at least one additional propulsion unit, and thus generate additional thrust. The part of the carrier rocket reduced by the boosters can then still be designed as a staged rocket, so that it can drop so-called "lower stages" with empty propellant tanks, and/or propulsion units, during flight when these are no longer needed. In this manner, only a relatively light, so-called "upper stage" of the rocket has to fly on to the designated orbit. Due to the mass reduction, propellant can be saved, or with the same propellant consumption a higher payload or a higher orbit can be achieved.

SUMMARY OF THE INVENTION

It is an object of the present invention to provide a technique that enables an alternative launch concept for carrier rockets.

A carrier rocket system in accordance with the invention comprises a carrier rocket for the transport of at least one load into an earth orbit. Furthermore, the carrier rocket system comprises a detachable launch assistance unit to be connected, or already connected, to the carrier rocket. The carrier rocket system is set up so as to lift off in a coupled state, that is to say, when the carrier rocket is connected to the launch assistance unit, by means of the launch assistance unit, in a horizontal launch. Here the thrust necessary for the launch is generated at least partially by at least one propulsion unit (preferably designed as a liquid rocket propulsion unit) of the carrier rocket. In particular, the launch assistance unit is set up so as to support the combined carrier rocket system with aerodynamic lift; it preferably comprises at least two lifting surfaces.

In particular, the carrier rocket system is set up so as to accelerate to supersonic speed in flight, and to detach the launch assistance unit from the onward-flying carrier rocket after the optimum conditions for the system in terms of speed, altitude and angle of climb have been achieved. The launch assistance unit is set up so as to fly back to the earth's surface, in particular to a designated runway, after detachment and a ballistic flight phase. It is preferably reusable, that is to say, it is set up so that after detachment from the carrier rocket and the return flight to the earth's surface it is detachably connected to at least a second carrier rocket, and can take off with the latter in an analogous horizontal launch.

The carrier rocket of a carrier rocket system in accordance with the invention is thereby preferably designed as a multi-stage carrier rocket. In particular, in this case, it comprises a plurality of stages and is set up so as to jettison one or more of the stages, preferably after the detachment of the launch assistance unit.

The present invention thus provides for a carrier rocket, which can take off horizontally, and accelerate to supersonic speed by means of a returning launch assistance unit. The tall assembly towers and launch towers required for vertical launches can thus be dispensed with, which represents a substantial saving in material and expense. The separation occurring before a supersonic speed is reached represents a substantially improved efficiency for the carrier rocket flying onward alone. By means of the launch assistance unit, the propellant payload can, by virtue of the aerodynamic lift, be substantially increased compared to carrier rocket systems intended for a vertical takeoff, preferably by a lengthening of the propellant tanks in the first stage, as a result of which the propulsion capability is increased compared to that of a vertical launch. This advantage can be used directly to increase payload capacity. In comparison to conventional carrier rocket systems, stages such as boosters can be eliminated while maintaining approximately the same payload, and/or (with a propellant tank unchanged compared to that for a vertical takeoff) the first stage can be operated with less expensive, smaller, or a smaller number of, main propulsion units.

The launch assistance unit is preferably equipped with at least one control system, which, in particular, can be set up to control the coupled phase and the return flight. Such a control system preferably comprises at least one rudder system. The pivoting control surfaces of the latter (for example elevators, ailerons, trim tabs, and rudders attached to additional stabilization surfaces, which can also be combined) can enable control of the carrier rocket system about the main axes in all aerodynamic phases of flight. The rudder systems can be additionally supported by the pivotable main propulsion unit of the first stage, so as to optimize the mass of the rudder systems and control surfaces. For the control of the ballistic phase, the launch assistance unit is preferably equipped with a positional control system based on the retro-firing principle, and/or, if there is sufficient residual atmosphere, with a retractable or detachable stabilizing parachute.

From its upper stage to its lowest stage, the carrier rocket preferably has a cylindrical shape throughout (with its associated cylindrical axis as the longitudinal axis of the carrier rocket). In particular, the carrier rocket of a carrier rocket system in accordance with the invention is preferably designed without boosters, that is to say, it is free of boosters, so that the high material and assembly costs usually associated with these are eliminated.

The at least one propulsion unit of the carrier rocket provided for thrust generation is preferably fed exclusively from at least one tank comprised in the carrier rocket; such a tank can in particular be an integral tank, that is to say, it can have a tank wall acting as a support structure. In particular, the carrier rocket can comprise all the propellant tanks of the carrier rocket system.

In accordance with advantageous forms of embodiment of a carrier rocket system in accordance with the invention, at least one propulsion unit, one payload adapter, one payload fairing, and/or the entire upper stage, are/is suitable to be used accordingly in a staged rocket intended for a vertical launch (also abbreviated in what follows to a "VTO staged rocket" by virtue of the English phrase "vertical take-off").

In particular, the appropriate components of a staged rocket designed for a vertical launch can thus be used as components of the carrier rocket of a carrier rocket system in accordance with the invention.

The use of at least one such component in the carrier rocket system in accordance with the invention, intended for a horizontal launch, offers the advantage of a development or construction saving, moreover, existing production facilities for these components, which were set up for vertically launched staged rockets, can also be used in a simple manner for the production of the component(s).

Alternatively or additionally, in forms of embodiment of a carrier rocket system in accordance with the invention, the carrier rocket of which is designed as a multi-stage rocket, at least one stage (for example at least one main stage) of the carrier rocket can comprise at least one stage section, which is suitable, or even designed, to be incorporated as at least one section of a corresponding stage in a/the staged rocket intended for a vertical launch. Such a stage section can thereby comprise the whole stage of the carrier rocket or just a part of the respective stage of the carrier rocket, in particular a section shortened in the longitudinal direction of the carrier rocket. Such an alternative use can be possible directly, or may require adaptation.

In particular, the corresponding stage sections of a VTO staged rocket can thus be used as stage sections of the carrier rocket of a carrier rocket system in accordance with the invention.

In addition to one or a plurality of the component(s), and/or at least one or a plurality of stage section(s), which is/are suitable or designed for use in a staged rocket suitable for a vertical launch, the carrier rocket can, in such forms of embodiment of a carrier rocket system in accordance with the invention, comprise at least one section (as a preferably cylindrical part of the carrier rocket about its longitudinal central axis), which section comprises a tank, or at least one part of a tank, for purposes of supplying an propulsion unit, in particular a main propulsion unit of the carrier rocket; such sections, by which the carrier rocket of a carrier rocket system is extended in comparison with a VTO staged rocket, are hereinafter referred to as "tank sections".

In comparison to the staged rocket designed for a vertical launch, in which the at least one stage section is suitable to be used, the carrier rocket in such forms of embodiment thus has, due to the at least one additional tank section, at least one additional and/or at least one enlarged tank for supplying at least one of its propulsion units. By this means, a sufficient supply of propellant to the carrier rocket for horizontal launch can be ensured, and a lack of boosters can be compensated for.

In comparison to the VTO staged rocket (intended for a vertical launch), in which the component(s) or stage section(s) of a carrier rocket are suitable to be used in accordance with an advantageous form of embodiment, the carrier rocket can have a length at least 1.2 times, or even at least 1.3 times, as large. In particular, the carrier rocket of a carrier rocket system in accordance with the invention can be constructed in such a manner that it could be converted into the staged rocket suitable for a vertical launch by reducing at least one of its stages (for example, by at least one such tank section) and adding at least one booster.

The carrier rocket can have a thrust-to-weight ratio at launch that is less than 1, less than 0.9, less than 0.8, or even less than 0.6 Thus, while a vertical launch would not be possible for the carrier rocket in such forms of embodiment, the launch assistance unit enables ascent in a horizontal launch. In particular, in forms of embodiment having at least one of the additional tank sections, the carrier rocket can have a small thrust-to-weight ratio of this kind.

For purposes of stabilizing a carrier rocket, the launch assistance unit can preferably comprise a support structure. In particular, this can be used to absorb loads resulting from the horizontal launch, in particular in the forms of embodiment with a liquid rocket propulsion unit. In particular, an adaptation of a primary structure of the carrier rocket, or of one or a plurality of design parameter/s, such as a tank wall thickness to the aforementioned loads, can thus be dispensed with. In a form of embodiment with the at least one tank section, the support structure can, in particular, counteract stresses that occur as a result of the additional length. Alternatively or additionally, the support structure can be set up so as to effect an aerodynamic shape of the carrier rocket system in the transition or contact region of the carrier rocket and the launch assistance unit, in the state in which the launch assistance unit is connected to the carrier rocket.

Since the support structure, as part of the launch assistance unit, is separated from the carrier rocket, mass and thus propellant can be saved, or payload mass can be increased for the onward flight. In the state in which the launch assistance unit is connected to the carrier rocket, the support structure preferably lies along at least one line or even in at least one region continuously (flat) against the carrier rocket.

In accordance with advantageous forms of embodiment with such a support structure, the support structure comprises two walls, between which the carrier rocket is arranged, in the state in which it is connected to the launch assistance unit. The walls in each case preferably extend in a longitudinal direction of the carrier rocket. In particular, the walls can form at least one part of a channel, which extends in the longitudinal direction of the carrier rocket, and preferably has a cross-section that is symmetrical at right angles to the longitudinal axis. Surfaces of the two walls facing towards the carrier rocket in the connected state can in each case, at least in some regions, extend along a respective plane. In particular, the two planes can then run parallel to each other, or be inclined towards each other.

Alternatively, the support structure can have at least one surface (in the connected state) facing towards the carrier rocket, which extends along a cylinder jacket; in the case of a plurality of such surfaces, these preferably extend along the same cylinder jacket. These forms of embodiment are particularly advantageous when an outer surface of the carrier rocket also extends along the cylinder jacket.

A carrier rocket system in accordance with the invention can be set up so as to separate a/the payload fairing, which is provided for the protection of at least one load in each case, transported by the carrier rocket, in flight, and to transport it to the earth's surface (in particular to the intended landing runway) by means of the launch assistance unit. This enables an advantageous load reduction after the phases critical for the protection of the launch as well as the flight in dense air layers, and a reuse of the payload fairing. In particular, the payload fairing can thereby in advantageous forms of embodiment, match the above-cited payload fairing that is suitable for use in a staged rocket intended for a vertical launch. In accordance with advantageous forms of embodiment, the payload fairing is at least partially collapsible, and/or foldable onto the launch assistance unit. Thus, the air resistance for the return flight can be optimized.

In subsonic flight, which is used for a first part of the take-off phase, but, in particular, for the return flight without propulsion, the launch assistance unit preferably, has a glide ratio (i.e., a ratio of a loss of altitude per distance travelled in gliding flight) which is in the range of 1:13 to 1:11.

In accordance with advantageous forms of embodiment, the launch assistance unit can have a variable wing shape, for example in that it comprises at least one combined cambered surface/aileron/elevator with a cambering function. Thus, a wing shape of the launch assistance unit can be advantageously modified during the return flight compared to the ascent in terms of long range, that is to say, a high glide ratio.

For the launch of the launch assistance unit, the latter can be set up so as to be connected to at least one (in each case preferably reusable, separate) transport and/or carriage device. In this manner, a particularly low weight of the launch assistance unit and thus of the carrier rocket system as a whole can be achieved during the launch. The launch assistance unit can then be set up, in particular, to effect a separation from the transport and/or carriage device by means of the pivoting of at least one elevator, which takes place during take-off. A carrier rocket system in accordance with the invention, can comprise such a transport and/or carriage device.

In accordance with advantageous forms of embodiment of the present invention, the launch assistance unit itself comprises at least one launch and/or landing device; such a device can comprise a taxiing system (with at least one wheel) and/or a sled system (with at least one skid). It is preferably set up so as to fly with the launch assistance unit, that is to say, so as not to be separated from the latter after launch. In particular, such a device can be used both for launch and for landing. In the case of a launch device, this enables a safe launch, which preferably also minimizes risks of any necessary launch abort. In the case of a landing device, a damage-free landing of the separated launch assistance unit at a designated landing site is made possible, as is a simple reuse, in particular without the need for recovery of the launch assistance unit.

The at least one launch and/or landing device can be designed for the weight of the loaded carrier rocket system, that is to say, can be designed to carry the latter. In particular, this enables test flights (without detachment of the launch assistance unit) with the return of the carrier rocket system to the earth's surface, for example to establish a flight envelope.

Alternatively, the at least one launch and/or landing device can be designed to carry only the weight of the launch assistance unit. In this case, the launch assistance unit is preferably set up so as to be detachably connected to an (additional) transport and/or carriage device for launching purposes, as stated above.

In accordance with advantageous forms of embodiment of the present invention, the launch assistance unit comprises an electronic and/or a mechanical control system and/or a combined electronic-mechanical control system for purposes of controlling the launch and/or the flight of the carrier rocket system, prior to detachment of the launch assistance unit, for purposes of effecting the detachment of the wing unit from the carrier rocket, and/or for purposes of controlling the launch assistance unit on its return flight to the earth's surface.

In each case, the control system can be set up so as to perform the control function alone, or in cooperation with at least one control system of the carrier rocket. A communication means, preferably comprised by the launch assistance unit, can thereby be set up so as to maintain a communication link to at least one ground station, and/or at least one flying component, in particular, such as a satellite or a space station. In this manner, external data can also be used for the control function. In particular, the launch assistance unit can be set up so as to navigate autonomously or under remote control.

The launch assistance unit of a carrier rocket system in accordance with the invention can preferably be set up so as to glide back to the earth's surface, at least in parts of its return flight, in particular in gliding flight.

The launch assistance unit can be designed without a propulsion unit; this enables a particularly light design.

In accordance with alternative forms of embodiment of a carrier rocket system in accordance with the invention, the launch assistance unit comprises a propulsion system, in particular an air-breathing propulsion system. The propulsion system can be set up so as to amplify a thrust generated by the propulsion unit of the carrier rocket when the launch assistance unit is coupled, that is to say, connected to the carrier rocket. Alternatively or additionally, the propulsion system can be set up so as to propel the launch assistance unit at least in some phases after its detachment from the carrier rocket. In particular, this can be used to abort a failed landing and reinitiate the latter.

The launch assistance unit can comprise at least one supply means that is set up so as to supply gas, electrical power, and/or hydraulic pressure to the carrier rocket when connected to the launch assistance unit. In this manner, weight can be saved in the carrier rocket itself.

A take-off method in accordance with the invention for a carrier rocket system, with a carrier rocket designed as a multi-stage rocket and a launch assistance unit connected thereto, comprises a horizontal take-off of the carrier rocket system by means of the launch assistance unit, an acceleration to a supersonic speed (that is to say, a speed above the speed of sound), detachment of the launch assistance unit from the onward-flying carrier rocket after the supersonic speed has been reached, the onward flight of at least one stage of the carrier rocket into an earth orbit, and the flight of the launch assistance unit back to the earth's surface, in particular to a designated landing runway.

The carrier rocket preferably has at least one liquid rocket propulsion unit. If it is designed as a multi-stage rocket, at least one of its stages preferably comprises such a liquid propulsion unit.

Acceleration to supersonic speed preferably comprises an angled ascent (also referred to as a "dog leg ascent"). This involves initially aiming for a high angle of climb at right angles to the planned azimuth, which enables a rapid gain in altitude and a reduced return flight distance, and, for a further accelerated climb (still at a subsonic speed), the aircraft is initially turned into the planned azimuth, and the angle of climb is flattened to facilitate the exceedance of the speed of sound. The flight altitude already reached, at which the air density is reduced compared to ground conditions and the propulsion unit performance is increased, thereby facilitates the passage through the speed of sound.

Prior to detachment, a maneuver is preferably performed to once again increase the pitch angle to the designated elevation for separation. In accordance with advantageous forms of embodiment of a take-off method in accordance with the invention, this renewed increase of the pitch angle takes place at supersonic speed, preferably at a Mach number of at least 1.5. The Mach number preferably does not exceed an upper limit that is determined by the limitation of the materials used with respect to the thermal heating, which increases with the Mach number.

After the detachment of the launch assistance unit, the carrier rocket can continue its flight at an elevated angle of ascent before entering a ballistic trajectory. The onward flight of the carrier rocket can include the jettisoning at least one stage of the carrier rocket. A pitch-up of the carrier rocket is preferably performed at a point in time determined in accordance with the prevailing aerothermal conditions. This can ensure that at least one stage of the carrier rocket reaches earth orbit.

If the carrier rocket system (as stated above) is set up so as to separate a payload fairing in flight and to transport it to the earth's surface by means of the launch assistance unit, the detachment of the launch assistance unit can take place at an altitude at which the payload fairing is dispensable, that is to say, its removal is advantageous, for example if the thermal flux generated by the residual atmosphere falls below a predetermined limit, that is to say, the atmosphere is sufficiently thin. The detachment can thus be delayed accordingly in such forms of embodiment. In accordance with advantageous variants, the payload fairing is at least partially folded together with the launch assistance unit, and/or folded onto the launch assistance unit, for the return flight.

The return flight of the launch assistance unit back to the earth's surface after detachment preferably comprises first a ballistic phase, and then atmospheric braking. An angle of attack at right angles to the wing surface is advantageous, because maximum drag is thereby generated without any undesirable lift (that would lengthen the flight path) at this time.

For the control of the flight attitude in the ballistic phase without an atmosphere that can be used aerodynamically, and during the atmospheric deceleration in the high atmosphere, the launch assistance unit is equipped with an attitude control system in accordance with the retro-firing principle, and/or, when there is sufficient residual atmosphere, with a retractable or detachable stabilization parachute.

Preferably as soon as the prevailing aerothermal conditions permit (that is to say, at a point in time selected as a function of these conditions), a steep turn is initiated towards a designated landing site. The earliest possible completion of the steep turn enables a saving of energy, which can be used for the onward flight.

As an alternative method, the launch assistance unit can be brought into the inverted position in the descending branch of the ballistic curve by a roll maneuver, in order then to align the angle of attack not completely at right angles to the direction of flight, so as to use the resulting lift to shorten the ballistic section of the flight. A steep turn is not necessary in this case because this maneuver leads directly into the return flight direction in the form of a half loop.

In accordance with advantageous forms of embodiment of a take-off method in accordance with the invention, the return flight comprises at least one glide phase in which the launch assistance unit glides towards the earth's surface, in particular in gliding flight. To achieve an advantageous glide speed below the speed of sound, the return flight, in particular the glide phase after the steep turn, can comprise a climb maneuver to convert the excess speed into an initial altitude, so as to achieve a maximum range for the return flight in gliding flight. Provided that the launch assistance unit comprises at least one propulsion system (in particular an air-breathing system), the latter can be used, when connected to the carrier rocket, to assist the thrust generated by the latter's propulsion unit (in particular during take-off, acceleration, and/or flight at supersonic speed) and/or for the return flight, and/or in the event of a failed attempt at landing.

In particular, a carrier rocket system in accordance with the invention is preferably set up so as to perform a take-off method in accordance with the invention in accordance with one of the forms of embodiment disclosed in this document, or a take-off method in accordance with the invention serves to launch a carrier rocket system in accordance with the invention in accordance with one of the forms of embodiment disclosed in this document.

A manufacturing method in accordance with the invention is used for the manufacture of a carrier rocket system in accordance with the invention in accordance with one of the forms of embodiment disclosed in this document and comprises the manufacture of the carrier rocket, in which at least one stage section, at least one propulsion unit, at least one payload adapter, and/or at least one payload fairing are incorporated, which are suitable, in particular designed or constructed, for use in a staged rocket intended for a vertical launch.

In accordance with advantageous forms of embodiment, a manufacturing method in accordance with the invention comprises the production of the carrier rocket with at least one rocket stage that is suitable for, or even designed for, a staged rocket suitable for a vertical launch. In particular, such a rocket stage can be at least partially manufactured on a production line designed and/or suitable for the production of rocket stages for vertically launched staged rockets. In particular, the manufacturing process can comprise the conversion of designated booster connection points into connection points for connection to the launch assistance unit.

BRIEF DESCRIPTION OF THE DRAWINGS

In what follows, preferred forms of embodiment of the invention will be explained in more detail with reference to drawings. It is to be understood that individual elements and components can also be combined differently than as shown.

Reference symbols for corresponding elements are used across the figures and are not described anew for each figure.

Here, in a schematic manner

Figure 1:
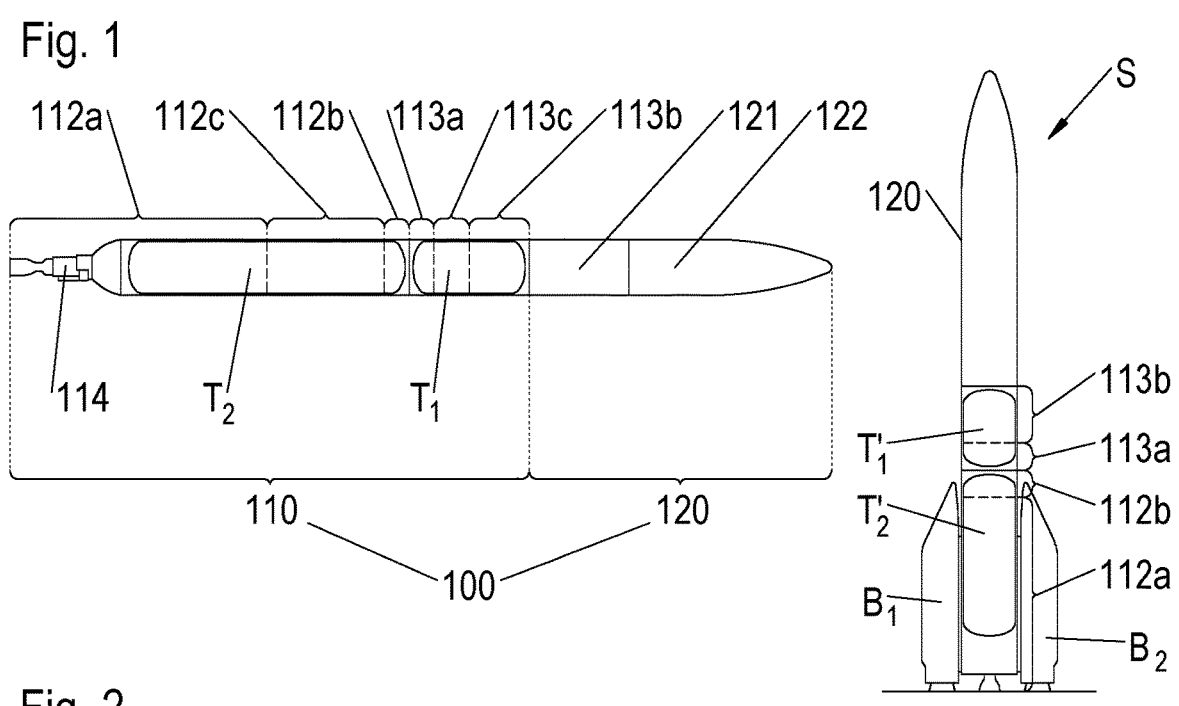
Figure 2:
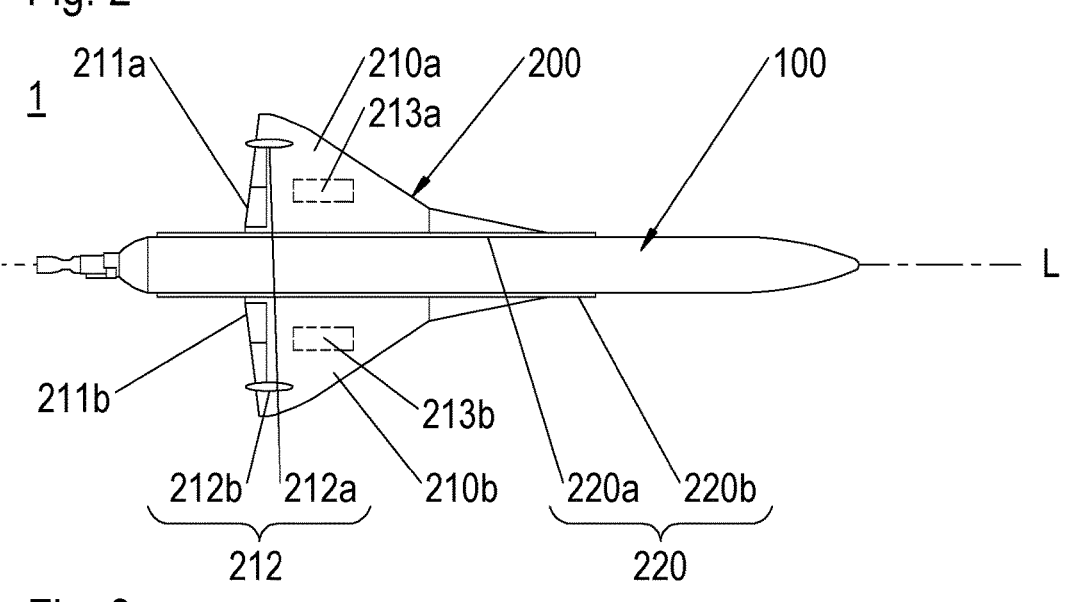
Figure 3:
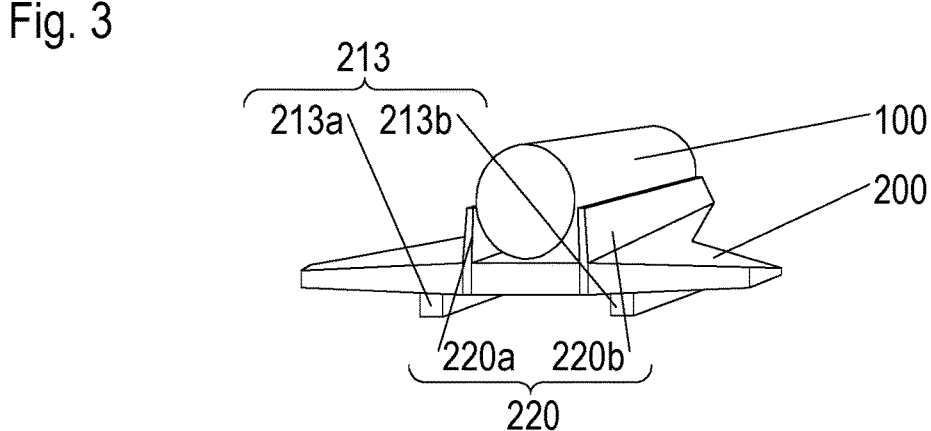
Figures 4, 5, 6:
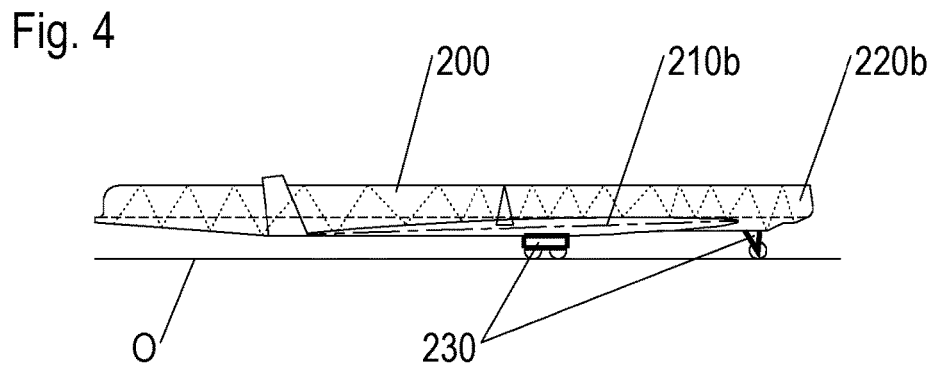

FIG. 1 shows an exemplary form of embodiment of a carrier rocket in accordance with the invention, in comparison with a staged rocket with boosters intended for a vertical launch;

FIG. 2 shows a plan view onto an example of embodiment of a carrier rocket system in accordance with the invention;

FIG. 3 shows a cross-sectional view of an exemplary carrier rocket system in accordance with the invention;

FIG. 4 shows a side view of a launch assistance unit of an example of embodiment of a carrier rocket system in accordance with the invention;

FIG. 5 shows a side view of an example of embodiment of a carrier rocket system in accordance with the invention, with an additional transport system; and FIG. 6 shows a sequence of a take-off method in accordance with the invention, in accordance with an example of embodiment.

DETAILED DESCRIPTION OF THE PREFERRED EMBODIMENTS

FIG. 1 shows the carrier rocket 100 of a form of embodiment of a carrier rocket system in accordance with the invention, in comparison with a staged carrier rocket S designed for a vertical launch. The carrier rocket 100 comprises an upper stage 120 with a propulsion stage 121 and a payload fairing 122, together with a payload adapter, which is not discernible as such in FIG. 1, and a flight control system. In accordance with advantageous forms of embodiment, the payload fairing 122 is detachable, and, in particular, the carrier rocket system comprising the carrier rocket 100 can be set up so as to return the payload fairing 122 to the earth's surface by means of the associated launch assistance unit (not shown) after their detachment.

The carrier rocket 100 furthermore comprises a first main stage 110 with propellant tanks for propellant and oxidizer, in each case shown in a sectional view such that tanks T1 and T2 respectively arranged therein are visible.

In the example of embodiment shown, the main stage 110 comprises stage sections 112a, 112b (each of which, in the present case, comprises a part of the tank T1, and of which the stage section 112a further comprises a propulsion unit 114) and an additional tank section 112c located between. In addition, the main stage 110 comprises the stage sections 113a, 113b (each of which in the present case comprises a part of the tank T2) and a tank section 113c located between.

The stage sections 112a (with the main propulsion unit 114), 112b, together with the stage sections 113a and 113b are in the present case suitable, or are designed, to be used in the staged rocket S shown on the right-hand side in FIG. 1, which is designed for vertical take-off (that is to say, whose structure is adapted to the loads occurring during a vertical ascent). In contrast, the additional tank sections 112c and 113c are not incorporated in the VTO staged rocket S. The latter, on the other hand, additionally comprises two boosters B1 and B2.

The omission of the B1, B2 boosters from the carrier rocket 100 allows considerable savings in material and expense, and avoids hazards when the boosters hit the earth's surface after they have been dropped. Since solid boosters emit pollutants during operation, omitting them is also environmentally beneficial. By using the components designed for the VTO staged rocket S (upper stage 120, the stage sections 112a (with the main propulsion unit 114),

112b, 113a and 113b), the design costs can be reduced, and existing production lines (created for the VTO staged rocket S) can also be used for the production of the carrier rocket 100.

In terms of propellant supply, the absence of boosters is compensated for by the tank sections 112c, 113c of the carrier rocket 100 that are not included in the VTO staged rocket S: by virtue of these sections, the tanks T1, T2 of the carrier rocket 100 are enlarged compared to the tanks T1', T2' of the VTO staged rocket S.

The omission of the boosters in the carrier rocket 100 also results in a reduced thrust-to-weight ratio compared to the VTO staged rocket, which can, in particular, be less than 1, less than 0.9, less than 0.8 or even less than 0.6 While the carrier rocket 100 is thus unable to launch vertically, in accordance with the present invention it can take off in conjunction with a launch assistance unit using aerodynamic lift, and can accelerate to supersonic speed, as described above and also explained with reference to the further figures.

FIG. 2 shows a plan view of a carrier rocket system 1 in accordance with the invention, with a carrier rocket 100, which is connected to a launch assistance unit 200. The launch assistance unit comprises two lifting surfaces 210a, 210b, which are formed symmetrically with respect to each other with respect to a plane of symmetry extending through the longitudinal axis L of the carrier rocket 100, and which comprise adjustable control surfaces 211a, 211b, which can combine the functions of elevators and ailerons. In addition, lateral stabilizers 212a and 212b are equipped with control surfaces for the rudder function.

In the illustrated example of embodiment, the launch assistance unit 200 further comprises an air-breathing propulsion system 213 with propulsion units 213a, 213b. In the depicted state of the launch assistance unit connected to the carrier rocket 100 the propulsion system 213 can be set up so as to amplify a thrust generated by the propulsion unit of the carrier rocket, and/or to propel the launch assistance unit 200 on its return flight to the earth's surface after its detachment from the carrier rocket 100.

For purposes of stabilizing the carrier rocket 100, the launch assistance unit 200 further comprises a support structure 220 with two walls 220a, 220b parallel to each other, which in the state shown, in which the launch assistance unit 200 is connected to the carrier rocket 100, extend in the longitudinal direction L of the carrier rocket 100 and in each case lie against one side of the carrier rocket 100. The particular loads resulting from a horizontal launch as well as the lengthening of the carrier rocket by the tank sections 112c, 113c (in comparison to the vertically launched staged rocket S on the right-hand side in FIG. 1) can thus be absorbed without the carrier rocket itself having to be designed for such loads.

FIG. 3 shows the carrier rocket system 1 in a sectional view at right angles to the longitudinal axis of the carrier rocket 100, in the connected state and from the rear. In particular, it can be seen here how the walls 220a, 220b of the support structure 220 of the launch assistance unit 200 in each case lie against the carrier rocket 100 along a line, and provide an aerodynamic shape of the carrier rocket system 1 in the transition or contact region of the carrier rocket 100 and the launch assistance unit 200.

In FIG. 4, the launch assistance unit 200 is shown in a side view without the carrier rocket, for example in the circumstances after a return from a flight with the carrier rocket. The earth's surface O can in particular be a runway. The launch assistance unit comprises a launch and/or landing device 230, which in the present case comprises a taxiing system with wheels. The taxiing system is preferably at least partially retractable, in particular retractable behind a casing of the launch assistance unit 200. In this manner, the air resistance of the launch assistance unit can be kept low during flight.

FIG. 5 shows a carrier rocket system 1 in accordance with the invention in a state ready for launch. The earth's surface O can in particular be a launch runway.

In addition to the carrier rocket 100 and the launch assistance unit 200, the carrier rocket system 1 in the example of embodiment illustrated comprises a transport device 300, to which the launch assistance unit 200 is detachably connected for purposes of accelerating the combined carrier rocket system on the ground. In particular, the carrier rocket system 1 is set up so as to leave the transport device 300 on the ground when the carrier rocket 100, connected to the launch assistance unit 200, lifts off. The separation can, in particular, take place with the pivoting of at least one elevator taking place for purposes of take-off, and/or by a pivoting of the main propulsion unit of the launch assistance unit 200.

In the circumstances shown in FIG. 5, the taxiing system shown in FIG. 4 is retracted and therefore not visible; in particular, in such a form of embodiment, the taxiing system is not used for take-off but only for landing, that is to say, it is purely part of a landing device.

FIG. 6 shows the sequence of a form of embodiment of a take-off method in accordance with the invention, in terms of possible flight paths of a carrier rocket and a launch assistance unit of a carrier rocket system in accordance with the invention: here, the take-off method begins with a horizontal take-off V/1, which comprises the taxiing, acceleration and take-off of the carrier rocket system on or from the earth's surface O on a take-off and landing runway B. A continued acceleration V/2-4 comprises an angled ascent V/2, in which an initially high angle of ascent, allowing rapid altitude gain and reduced return distance, is flattened to a further accelerated ascent V/3, and is then increased again in a maneuver V/4. After reaching designated separation conditions, a separation V/5 of the launch assistance unit from the carrier rocket takes place. The carrier rocket then continues its flight without the launch assistance unit V/6-7, which includes a further pitch-up V/6 and a further flight V/7 into an earth orbit and an entry into a ballistic trajectory. As stated above, the pitch-up is preferably performed at a point in time determined as a function of the aerothermal conditions prevailing. Until its arrival in the designated earth orbit, the carrier rocket can drop one or more stages (not shown).

In forms of embodiment in which the carrier rocket system is set up so as to detach a payload fairing in flight, and transport it to the earth's surface by means of the launch assistance unit, after the speed of sound has been exceeded the detachment V/5 of the launch assistance unit can also be delayed such that it takes place at an altitude at which the payload fairing is dispensable.

After the detachment V/5 from the carrier rocket the launch assistance unit flies back to the earth's surface. In the form of embodiment shown, the return flight V/8-12 comprises first a ballistic phase V-8, then atmospheric braking V-9, a subsequent flight V-10 through a steep turn towards the runway B, which is followed by gliding flight V-11, with a climb to use up excess speed, and finally a descent, preferably in pure gliding flight V-12, before the launch assistance unit lands on the runway B V-13.

Disclosed is a carrier rocket system 1, with a carrier rocket 100, together with a launch assistance unit 200, which is detachably connected, or connectable, to the carrier rocket 100. The carrier rocket system 1 is set up so as to take off in a horizontal launch by means of the launch assistance unit 200, in which thrust is generated by at least one propulsion unit 114 of the carrier rocket 100. Here the launch assistance unit 200 can be detached from the onward-flying carrier rocket 100 after supersonic velocity has been reached, and is set up so as to fly back to the earth's surface O after its detachment V/5 from the carrier rocket 100. The launch assistance unit 200 preferably provides all the necessary structural supports to enable a carrier rocket 100 that has been designed for a vertical launch to use one or more of its essential components without structural modifications.

Also disclosed are a take-off method for a carrier rocket system 1, together with a manufacturing method for a carrier rocket system 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOLS

1 Carrier rocket system
100 Carrier rocket
110 Main stage
112a, 112b, 113a, 113b Stage section
112c, 113c Tank section
114 Main propulsion unit
120 Main stage
121 Propulsion stage
122 Payload fairing
200 Launch assistance unit
210a, 210b Lifting surface
211a, 211b Elevator
212a, 212b Side stabilizer
213 Air-breathing propulsion system
213a, 213b Propulsion unit
220 Support structure
220a, 220b Wall
230 Launch and/or landing device
300 Transport device
B Launch and landing runway
$B_1$, $B_2$ Booster
L Longitudinal axis of the carrier rocket
O Earth's surface
S (VTO) staged rocket intended for a vertical launch
$T_1$, $T_2$, $T_1'$, $T_2'$ Tank
Steps in the Method:
V/1 Horizontal launch
V/2-4 Acceleration to supersonic speed
V/2 Angled ascent
V/3 Further accelerated climb V/4 Increase of the gradient angle V/5 Detachment of the launch assistance unit from the carrier rocket V/6 Further pitch-up of the carrier rocket V/6-7 Continuation of the flight of the carrier rocket without the launch assistance unit V/7 Further flight into an earth orbit/entry into ballistic phase of the carrier rocket V/8 Ballistic phase of the launch assistance unit V/8-12 Return flight of the launch assistance unit V/9 Atmospheric braking V/10 Flight in a steep turn V/11 Glide with climb V/12 Descent V/13 Landing

The invention claimed is:

1. A carrier rocket system, which comprises a carrier rocket for a transport of at least one load, and a launch assistance unit, detachably connected, or to be connected, to the carrier rocket, wherein the carrier rocket system is set up to take off in a horizontal launch by means of the launch assistance unit, with thrust generation by at least one propulsion unit of the carrier rocket, wherein the launch assistance unit is detachable from the onward-flying carrier rocket after supersonic speed has been reached, and is set up to fly back to a surface of the earth after detachment of the launch assistance unit from the carrier rocket, wherein, during the horizontal launch, the at least one propulsion unit of the carrier rocket, deployed for said thrust generation in the horizontal launch, is only configured to be fed from at least one tank of the carrier rocket, and wherein respectively measured in a designated flying direction, a length of the carrier rocket exceeds the launch assistance unit's entire length.

2. The carrier rocket system according to claim 1, wherein the carrier rocket comprises at least one of at least one stage section, at least one propulsion unit, at least one payload adapter, or at least one payload fairing, which respectively is/are suitable for use in a staged rocket configured for a vertical take-off.

3. The carrier rocket system according to claim 2, wherein the carrier rocket additionally comprises one, two or more tank sections, in each case with at least one part of at least one tank.

4. The carrier rocket system according to claim 1, wherein the launch assistance unit comprises a support structure for purposes of stabilizing the carrier rocket.

5. The carrier rocket system according to claim 1, which is set up to detach in flight a payload fairing provided for a protection of at least one load transported by the carrier rocket in each case, and to transport the payload fairing to a surface of the earth via the launch assistance unit.

6. The carrier rocket system according to claim 1, at least one of wherein the launch assistance unit comprises at least one of at least one launch or landing device, in each case with at least one of a taxiing system or a carriage system, wherein the launch assistance unit is set up so as to be detachably connected to at least one of a carriage or sled device, for purposes of accelerating the combined carrier rocket system on the ground;

wherein the launch assistance unit comprises at least one of an electronic or mechanical control system for purposes of controlling at least one of the launching or flying, carrier rocket system, prior to the detachment of the launch assistance unit; or wherein the launch assistance unit is set up so as to glide back to a surface of the earth, in gliding flight;

wherein the launch assistance unit comprises at least one air-breathing propulsion system for purposes of at least one of amplifying a thrust generated by the propulsion unit of the carrier rocket in a coupled state, or propelling the launch assistance unit after detachment of the launch assistance unit from the carrier rocket; or wherein the launch assistance unit comprises one or a plurality of supply means for purposes of supplying the carrier rocket in the coupled state with at least one of gas, electrical power, or hydraulic pressure.

7. The carrier rocket system according to claim 1, wherein the launch assistance unit has a variable wing shape.

8. A carrier rocket for a carrier rocket system, the carrier rocket for a transport of at least one load and the carrier rocket comprising a launch assistance unit, detachably connected, or to be connected, to the carrier rocket, wherein the carrier rocket is configured to take off in a horizontal launch by the launch assistance unit with thrust generation by at least one propulsion unit of the carrier rocket, wherein the launch assistance unit is detachable from the onward-flying carrier rocket after supersonic speed has been reached, and is configured to fly back to a surface of the earth after detachment of the launch assistance unit from the carrier rocket, wherein, during the horizontal launch, the at least one propulsion unit of the carrier rocket, deployed for said thrust generation in the horizontal launch, is only configured to be fed from at least one tank of the carrier rocket, and wherein respectively measured in a designated flying direction, a length of the carrier rocket exceeds an entire length of the launch assistance unit.

9. A take-off method for the carrier rocket system according to claim 1, with the carrier rocket designed as a multi-stage rocket, and with the launch assistance unit initially connected to the carrier rocket, wherein the take-off method comprises:

the horizontal launch of the carrier rocket system aided by the launch assistance unit and with thrust generated by at least one propulsion unit of the carrier rocket, an acceleration to supersonic speed, a detachment of the launch assistance unit from the onward-flying carrier rocket after the supersonic speed has been reached, an onward flight of at least one stage of the carrier rocket into an earth orbit, together with a return flight of the launch assistance unit to a surface of the earth, wherein, during the horizontal launch, the at least one propulsion unit of the carrier rocket, deployed for said thrust generation in the horizontal launch, is fed exclusively from at least one tank of the carrier rocket.

* * * * *